Figure 1:
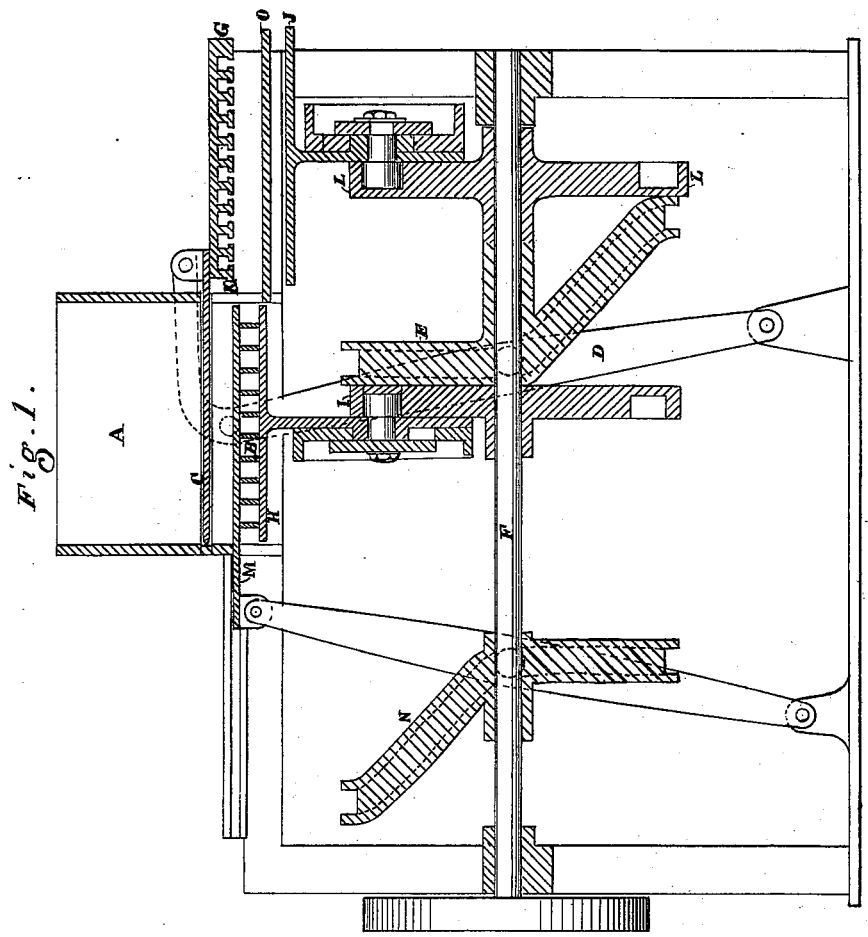

2 Sheets—Sheet 1.

F. WESTERMANN & O. MURSCH.
CUBE SUGAR-MACHINE.

No. 191,391. Patented May 29, 1877.

Witnesses
Geo. H. Strong
Jno. L. Borno

Inventor
Francis Westerman
Otto Mursch
by Dewey &
Attys.

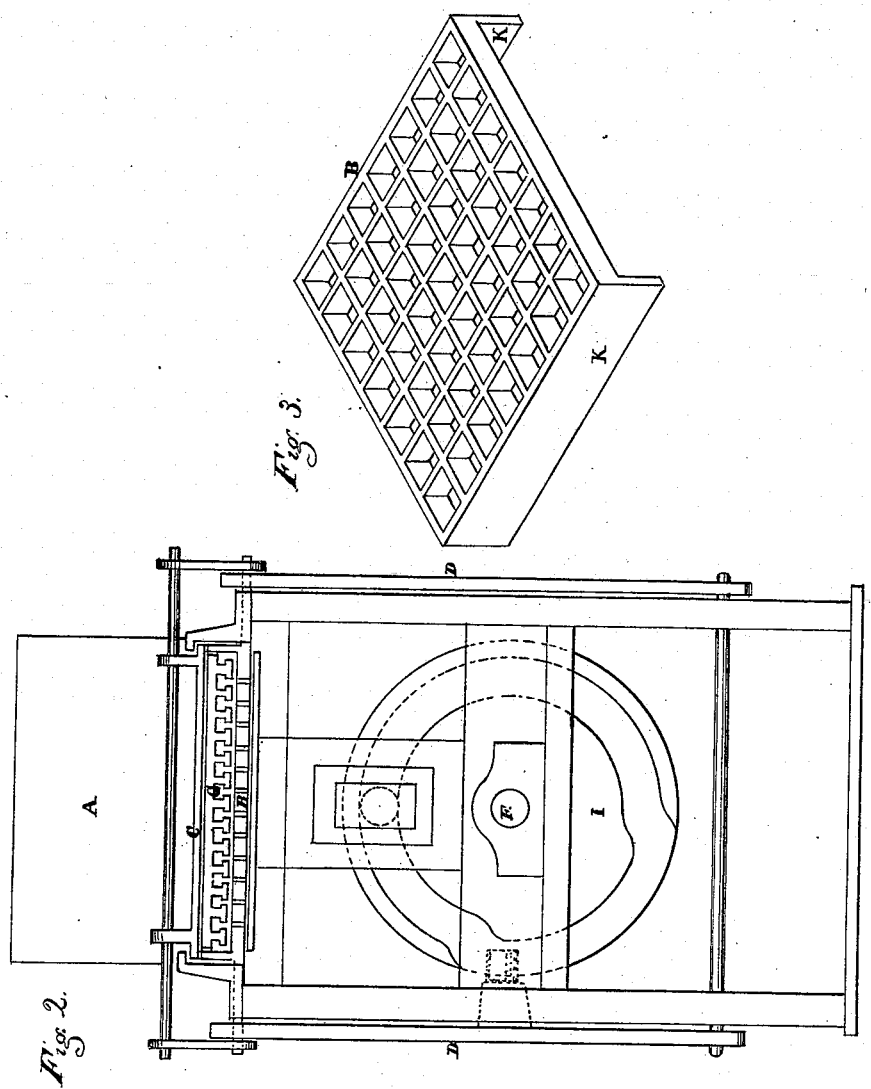

UNITED STATES PATENT OFFICE.

FRANCIS WESTERMANN AND OTTO MURSCH, OF SAN FRANCISCO, CAL., ASSIGNORS TO LÜDER HÖPKEN, OF SAME PLACE.

IMPROVEMENT IN CUBE-SUGAR MACHINES.

Specification forming part of Letters Patent No. 191,391, dated May 29, 1877; application filed March 23, 1877.

*To all whom it may concern:*

Be it known that we, FRANCIS WESTERMANN and OTTO MURSCH, of the city and county of San Francisco and State of California, have invented a Cube-Sugar Machine; and we do hereby declare the following to be a full, clear, and exact description thereof, reference being had to the accompanying drawings.

The object of our invention is to provide an improvement in that class of apparatus which is designed for the conversion of granular sugar into solid cubes for market; and it consists of molds, which have a reciprocating motion alternately beneath a hopper containing loose sugar, and beneath a series of stationary punches. At the end of each movement these molds are forced upward, first into a mass of sugar, which has been cut off from the main hopper by a slide, so that the molds are filled, and then beneath the stationary punches, which thus extract the sugar from the mold, and leave it upon a surface for removal.

These operations are carried out by means of suitable cams and levers, as will be more fully described by reference to the accompanying drawings.

Figure 1 is a longitudinal vertical section. Fig. 2 is a transverse section; and Fig. 3 a perspective view of the molds.

A is a hopper to contain loose sugar. B are the molds, and C is a cut-off slide, which is operated simultaneously with the molds by means of a lever-arm, D, which connects with both, and is caused to swing forward and back by means of a cam, E, mounted upon the shaft F, as shown. G are the stationary punches, which are fixed at one side of the hopper, and by means of the cam E and lever the molds are caused to reciprocate from a position beneath the hopper to one beneath the punches. When beneath the hopper the molds rest upon a plate, H, which then forms a temporary bottom for them, and is forced upward by means of a vertically-acting cam or eccentric, I. This causes the open upper face of the molds to be pressed into the sugar, and they are thus filled. When the molds leave this platen H they pass beneath the punches G, moving upon a plate, J, where they rest upon edges K, which project below the body of the molds, so that when forced upward the plate J lifts the molds by these edges, and thus leaves a space between for the sugar to escape and fall upon a platform provided for the purpose. This upward movement is accomplished by a cam or eccentric, L, which is mounted upon the shaft F, and operates the plate J. A sliding cut-off, M, runs across the hopper close against the top of the molds, and is operated by a cam, N, upon the main shaft F, so that it is withdrawn after the molds are in position beneath the hopper to allow them to be filled.

The operation will then be as follows: When the molds pass beneath the sliding cut-off M the slide C passes through the sugar in the hopper a short distance above M, thus separating a portion of the sugar from the mass. The slide M is then withdrawn by the cam N, and the molds are forced up into this portion of sugar by the cam I. The slide C serves as a platen, against which the sugar is held, so that the upward movement of the molds serves to compress the sugar firmly into them—an important feature in our process, as no other stamps or pressers are necessary. The slide M then returns across the hopper, cutting off close to the molds, and they, together with the slide C, are withdrawn from the hopper. This movement allows a new supply of sugar to fall or be forced down upon the slide J in a compact form, and ready for a new charge for the molds. Meanwhile the molds have passed beneath the punches G, and the cam L then lifts the plate J, and, as the molds now rest upon their edge-plates K, it will be seen that there is nothing beneath them to prevent the escape of the sugar, which is pressed out by the upward movement of the molds against the stationary punches G. A platform or tray, O, resting upon the plate J, just beneath the molds, receives the sugar as it leaves the molds, and this tray is withdrawn with the load of sugar upon a carrying-belt moving transversely in front of this end of the machine. A new tray or platform is substituted for each charge, and thus the operation becomes continuous, as the belt removes the trays as fast as they are placed upon it. The cut-off slide C as it moves back from the hopper passes in guides above the stationary punches, while the molds pass beneath them.

The construction of our molds is very simple, they being simply a cast frame, consisting of squares with vertical sides, and open at both top and bottom. As before described, when the molds have passed beneath the hopper their bottoms rest directly upon the platen H, which thus serves as a bottom to the molds, and also by means of the cam I to force them upward into the conpact body of sugar, which is cut off from the main body by the slide C. After the molds have descended, which their weight easily enables them to do, the sliding cut-off M moves closely over their upper surface, and cuts off the sugar above the molds, so that they are then full of sugar in properly-compressed cubes. The sugar will then remain in molds while they are passing from a point beneath the hopper to a point beneath the punches, and until the latter remove it.

It will be seen that our molds can be easily removed bodily for cleaning and others substituted without delaying the work, and the molds are easily washed, ready for replacement, thus avoiding one of the most troublesome features of cylindrical or other shaped machines, where the molds are stationary and the punches movable, or where springs are used, as all the parts become speedily gummed up and rendered useless unless they can be easily cleaned without stopping the operation for any great length of time.

Having thus described our invention, what we claim as new, and desire to secure by Letters Patent, is—

1. In a machine for the manufacture of cube sugar, the combination of the hopper A, the series of stationary punches G, and reciprocating molds B, arranged to be moved alternately beneath said hopper to be filled, and beneath said stationary punches to be emptied, substantially as described.

2. The combination, with the hopper A and a series of stationary punches, G, of the reciprocating molds B and mechanism, operating substantially as described, whereby said molds are moved vertically upward into the mass of sugar to be filled, and then depressed and moved beneath said series of stationary punches, and again moved upward, so that the punches will discharge their contents, substantially as specified.

3. In combination with the reciprocating molds B, which are filled by an upward movement into the sugar-receptacle, the cut-off slide C to separate off a portion of the sugar from the main body, and act as a pressure-plate to compress the sugar into the molds, substantially as herein described.

4. The plate H, serving as a temporary bottom for the molds while they are being filled, and the cam I to force the molds upward into the sugar, whereby they are filled and the sugar compressed at one operation, substantially as herein described.

5. The molds B, having the downwardly-projecting edge-plates K, in combination with the plate J and the cam L, whereby the molds are forced upward to the punches, and space is left for the escape of the sugar, substantially as herein described.

In witness whereof we have hereunto set our hands and seals.

FRANCIS WESTERMANN. [L. S.]
OTTO MURSCH. [L. S.]

Witnesses:
WM. H. THOMPSON,
OLWYN T. STACY.